(No Model.) 3 Sheets—Sheet 1.

D. GESSNER.
CLOTH PRESSING MACHINE.

No. 387,297. Patented Aug. 7, 1888.

Witnesses:
D. H. Driscoll.
Charles T. Ward.

Inventor:
David Gessner,
By Gifford & Brown, Attys.

N. PETERS, Photo-Lithographer, Washington, D. C.

(No Model.) 3 Sheets—Sheet 2.
D. GESSNER.
CLOTH PRESSING MACHINE.
No. 387,297. Patented Aug. 7, 1888.
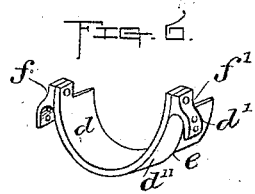
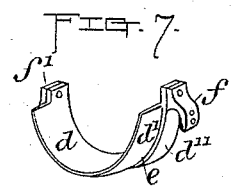
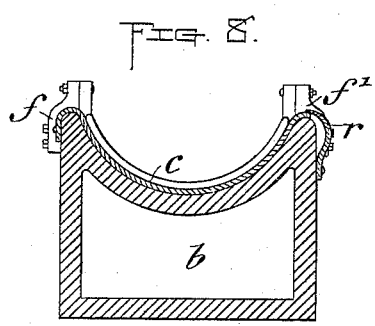
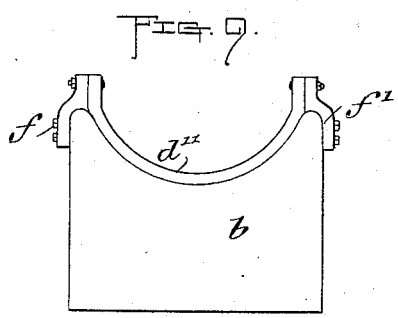
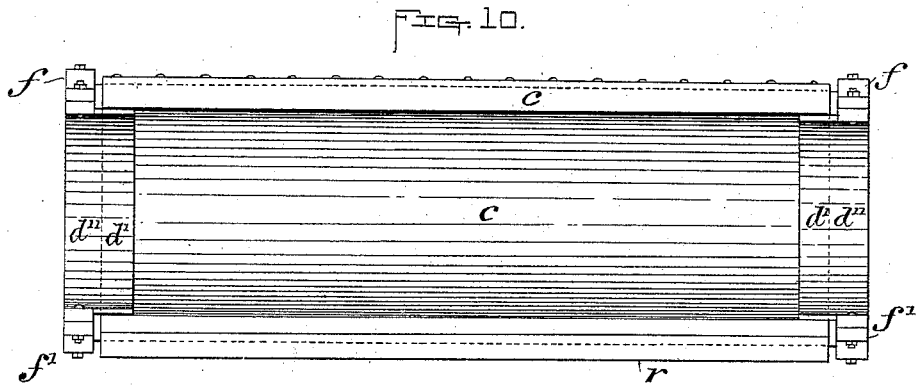
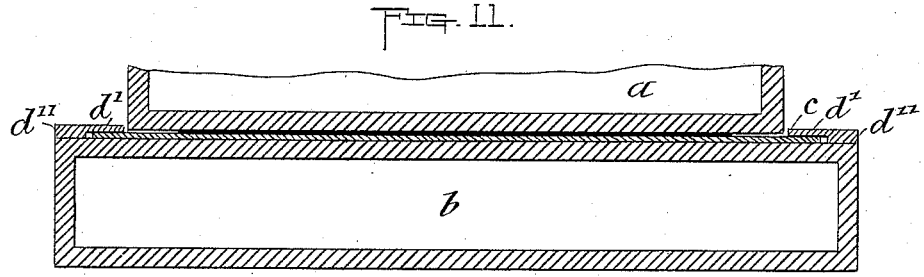
Witnesses:
D. H. Driscoll.
Charles T. Ward.
Inventor:
David Gessner,
By Gifford & Brown, Attys.

(No Model.) 3 Sheets—Sheet 3.
D. GESSNER.
CLOTH PRESSING MACHINE.
No. 387,297. Patented Aug. 7, 1888.
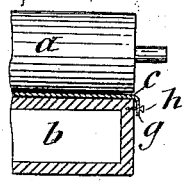
Fig. 12.
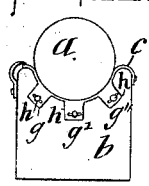
Fig. 13.
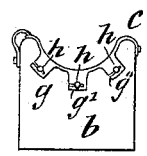
Fig. 14.
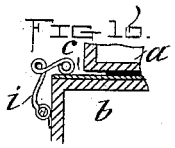
Fig. 16.
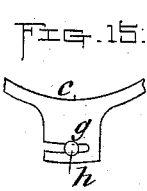
Fig. 15.
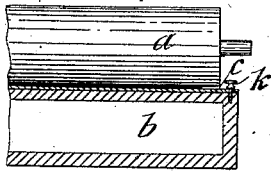
Fig. 17.
Fig. 19.
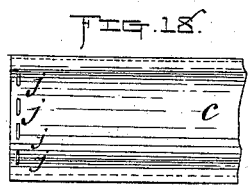
Fig. 18.
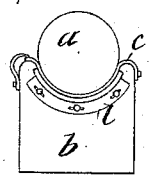
Fig. 20.
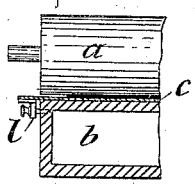
Fig. 21.
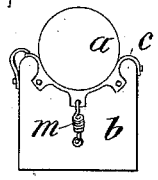
Fig. 22.
Fig. 24.
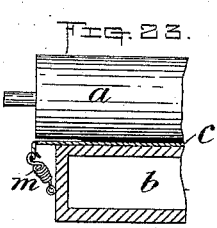
Fig. 23.
Fig. 25.
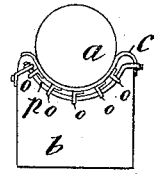
Fig. 26.
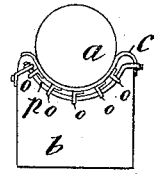
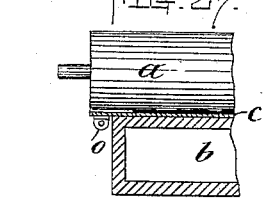
Fig. 27.
Witnesses:
A. H. Driscoll.
Charles F. Wood.
Inventor:
David Gessner,
By Gifford & Brown, Att'ys.
N. PETERS, Photo-Lithographer, Washington, D. C.

UNITED STATES PATENT OFFICE.

DAVID GESSNER, OF WORCESTER, MASSACHUSETTS.

CLOTH-PRESSING MACHINE.

SPECIFICATION forming part of Letters Patent No. 387,297, dated August 7, 1888.

Application filed May 26, 1886. Renewed June 16, 1888. Serial No. 277,355. (No model.)

*To all whom it may concern:*

Be it known that I, DAVID GESSNER, a citizen of the United States, residing at Worcester, in the county of Worcester and State of Massachusetts, have invented a new and useful Improvement in Cloth-Pressing Machines, of which the following is a specification.

The sheet-metal jacket such as heretofore employed in cloth-pressing machines is represented in the patent to Springborn and Baush, No. 197,571, and in the patent to Ernest Gessner, No. 206,718. In the two classes of machines represented in these patents it becomes necessary for the operator, whenever he desires to remove or replace a jacket, to partially take apart the machine, thus causing considerable delay in their operation, which is followed by a general readjustment of almost the whole machine in every instance when a removal or replacement of jacket is required.

To overcome the difficulty of dismounting a great part of the whole machine in order to remove or replace only the jacket constitutes the first part of my invention.

Figure 5:
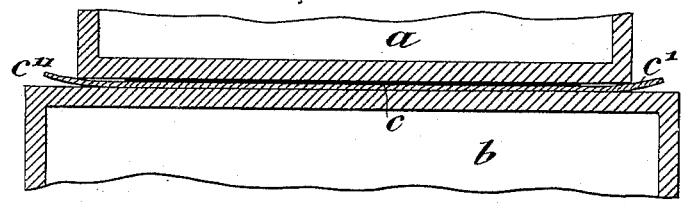

Again, in the machine already referred to, to allow for the deviations in woolens beyond their regular width, which frequently occur in their manufacture, the pressing parts are constructed wider than the common width of the cloth would call for, so that whenever the goods at any time run wider than ordinarily they may be pressed upon the same machine as well as though they were narrower and of regulation width. The sheet-metal jacket used heretofore has been fitted loosely to the concave or face of the bed, and has been fastened only upon one or both sides, where it overlaps the bed and where it extends downward over the sides of the bed, thus permitting quite an amount of play all over that portion of its surface which covers the concave or face of the bed. When cylinder and bed are brought together for pressing, the sheet-metal jacket, which is intermediate the two, will settle back into the concave of the bed wherever the pressure brought against it by the cylinder extends, and, being very springy, the jacket will recede from the concave and spring back again from the face of the bed as soon as the pressure brought against it ceases. When cloth is introduced between the cylinder and the sheet-metal jacket, the jacket will at once settle back into the concave of the bed wherever the cloth is pressed against it by the cylinder; but it remains compartively loose from the concave of the bed over that portion of its surface which is not covered by the cloth and thus not pressed or set back by the cylinder. Thus the margins of the jacket projecting beyond the cloth come in contact with the iron cylinder and are worn through or roughened by the grinding action of the cylinder, so that the cloth is damaged upon reaching these places whenever it happens to run wider than usual. This condition of things is illustrated in Figure 5 of the drawings upon Sheet 1, where the black line between *a* and *c* denotes the cloth being pressed, and it will be noticed that the ends or margins *c′ c″* of the sheet-metal jacket have sprung upward into contact with the cylinder *a*. To alleviate this trouble in operating these machines, it has been the custom for the operator to introduce separate strips of material beyond the edges of the cloth and to wind them around the ends or heads of the cylinder, so as to interpose these strips between the cylinder and the margins of the sheet-metal jacket where the latter extend beyond the regular path of the cloth while being pressed; but these strips fast wear to shreds and need constant renewing every day, thus causing too much attention on the part of the operator to keep them in order. Besides, they wear impressions into the jacket, which afterward leave marks upon the goods.

The second part of my invention is intended to provide a means for preventing the difficulties above alluded to by securing the ends or margins of the sheet-metal jacket to the face of the bed in such a way that they cannot come in contact with the cylinder, as heretofore.

In the drawings I have shown the means by which I prefer to carry out this invention and various modifications of the same.

In the various figures of the drawings, *a* represents the cylinder. *b* represents the bed-plate, and *c* represents the sheet-metal jacket.

Figure 2:
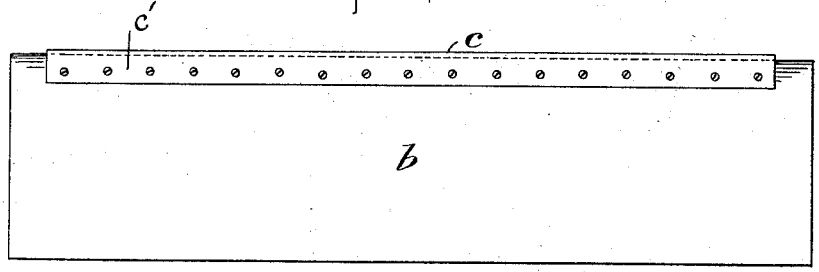
Figure 1:
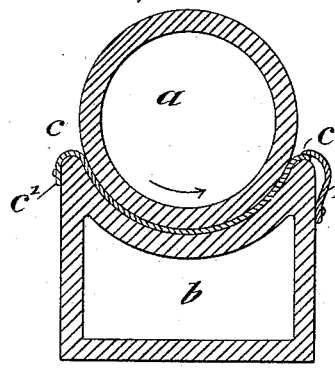
Figure 2B:
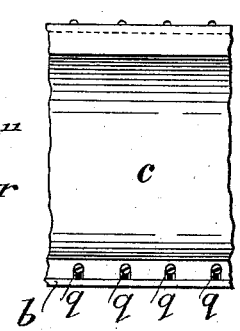

Fig. 1 is a cross-section through the cylinder, bed-plate, and sheet-metal jacket, representing the parts in position for use. Fig. 2 shows the front side of the bed-plate with the screws attaching the sheet-metal jacket.

Figure 4:
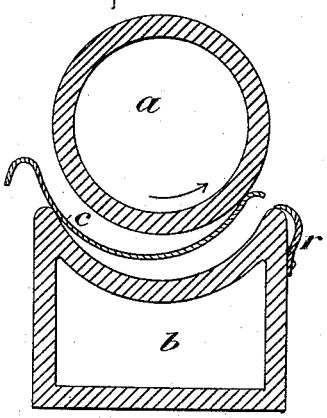
Figure 3:
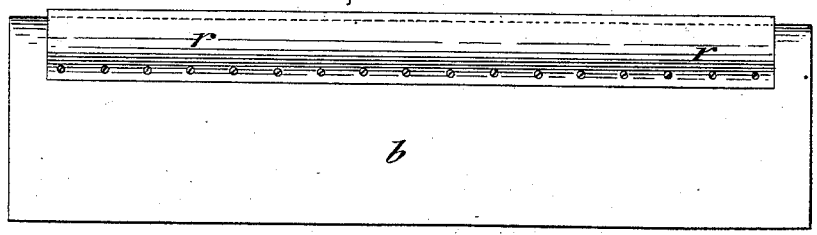

Fig. 3 shows the rear side of the bed-plate, with the attachment clamp by which one edge of the sheet-metal jacket is held in place. Fig. 4 is the same as Fig. 1, excepting that the parts are shown in the position they would occupy when the sheet-metal jacket was being removed from the machine. Fig. 5 illustrates one of the difficulties in the machines heretofore in use which it is the design of my improvement to overcome. Figs. 6 and 7 show in detail one of the devices by which the ends of the sheet-metal jacket may be secured in place on the bed-plate. Fig. 8 is a section through the bed-plate and sheet-metal jacket, showing also the device of Figs. 6 and 7 in position. Fig. 9 is an end view of the bed-plate with the device of Figs. 6 and 7 in position. Fig. 10 is a plan view of the parts shown in Fig. 8. Fig. 11 is a longitudinal section of the parts shown in Fig. 10, taken through the axis of the cylinder. Figs. 12, 13, and 14 are respectively a longitudinal section and end view with the cylinder, and an end view without the cylinder, of a modification. Fig. 15 represents a detail of the attaching means shown in the preceding figure. Fig. 16 represents a sectional detail of the cylinder, bed-plate, and sheet-metal jacket, with still another means of securing the latter in place. Figs. 17 and 18, respectively, show a longitudinal section, parts in elvation, and a plan view of part of the bed-plate and sheet-metal jacket secured together by still another modification. Fig. 19 shows the screw employed in the modification last referred to. Figs. 20 and 21 show still another modification of the means of securing the bed-plate and sheet-metal jacket together. A still further means for the same object is shown in Figs. 22, 23, and 24. A still further means is shown in Figs. 25, 26, and 27.

I will now describe the mechanism preferably employed in carrying out the first part of my invention, which is more particularly shown in Figs. 1, 2, 3, and 4 of the drawings.

The sheet-metal jacket is made of about the form shown in Fig. 1, the cloth passing through the machine in the direction of the arrow. A series of screws (shown in Fig. 2) secure the edge $c'$ of the sheet-metal jacket to the side of the bed-plate on the side at which the cloth enters, and from this point of attachment the sheet-metal jacket is formed so as to follow the contour of the bed-plate until it reaches the point just beyond where the cloth passes from the pressure, as at $c''$. Here the sheet-metal jacket stops and the clamp $r$ is provided, which is attached at its lower edge to the side of the bed-plate, as shown in Fig. 3, and extends upward and just over the edge of the sheet-metal jacket, clamping the sheet-metal jacket at this edge to the bed-plate with a yielding pressure. This clamp is made of sheet metal, and preferably extends continuously across the whole length of the sheet-metal jacket, and its upper edge is chamfered off, so as to produce very little, if any, obstruction to the smooth passage of the cloth from the machine. By providing this clamp in lieu of extending the sheet-metal jacket, as heretofore, downward on each side of the bed-plate to hold it in place, it is plain that by removing the screws shown in Fig. 2 the sheet-metal jacket may be removed from the machine, as indicated in Fig. 4, without being obstructed by the bend, which would be necessary in each edge of the jacket if the clamp $r$ were made in one piece therewith, and not in a separate piece, as here shown, it being well known that with the old construction the most convenient means of removing the jacket from the machine would be by sliding it off of the bed endwise, which would require provision in the frame and other parts of the machine to enable it to be done.

In lieu of the clamp $r$ for holding the edge of the jacket, and as the mechanical equivalent of said clamp, I may employ a series of screws passing through slots all along the edge of the jacket and into the bed-plate. This modification is shown in Fig. 28, where $q\ q$, &c., are the screws, and the slots are clearly shown. By these slots sufficient play is provided for between the jacket and the bed-plate to prevent injury to the same, which would be the result of securing both edges thereof rigidly to the bed-plate. In employing this construction care should be taken to make a smooth finish of the heads of the screws and the joint between the same and the jacket.

I will now proceed to describe mechanism suitable for carrying out the second part of my invention.

In Figs. 6 and 7 I have shown the form of device which I prefer for this purpose. This device consists of a metallic semicircular piece, $d$, having the same curvature as the face of the bed-plate. On its under side is formed a rabbet at $e$, which is just deep enough to correspond with the thickness of the sheet-metal jacket without binding the same. The piece $d$ is therefore made of two thicknesses, the portion $d'$ being thinner than $d''$ by about the thickness of the sheet-metal jacket. The portion $d''$ is extended upward slightly above the portion $d'$, so as to form ears, to which are bolted the pieces $f\ f'$, which are constructed, as shown, so as to overlap the outside of the bed-plate and be bolted thereto, as shown in Figs. 8 and 9. When the pieces shown in Figs. 6 and 7 are secured to the bed-plate, they will occupy the position shown in Figs. 8, 9, 10, and 11, where the margins of the sheet-metal jacket are shown as extending, without binding, under the portions or flanges $d'$, arranged at each end of the cylinder, so that it is impossible for those margins to spring up into contact with the cylinder, as heretofore. The mechanism which I have just described admits of sufficient freedom for the sheet-metal jacket to provide for the slight forward movement thereof which takes place when the operation of the cylinder commences, while it at the same time holds the ends or margins thereof securely to the bed-plate. It is a means which is also readily attached and detached. Another device which may be employed for the same purpose is illustrated in Figs. 12, 13, 14, and 15. It consists simply in extending the ends of the sheet-metal jacket at each end of the cylinder into ears $g\ g'\ g''$, which project beyond and are bent down in contact with the ends of the bed-plate, as shown. These ears are each provided with a slot, and the bolts $h$, passing through these slots and into the ends of the bed-plate, secure the ears to the bed-plate and thereby prevent the margins of the sheet-metal jacket from springing upward into contact with the cylinder. The slots in the ears afford sufficient play between the sheet-metal jacket and the bed-plate to accommodate the motion which will always take place from the action of the cylinder, particularly when a new jacket is used for the first time.

In Fig. 16 the margin of the sheet-metal jacket is shown as held down to the bed-plate by a spring-latch, $i$, which is secured to the bed-plate at the lower end and projects upward and over the margin of the sheet-metal jacket, producing sufficient pressure thereon to hold it in contact with the bed-plate. This spring-latch may be pivoted to the bed-plate, so that it can be thrown backward when it is desired to remove the sheet-metal jacket. A series of such spring-latches should be placed at each end of the bed-plate sufficient in number to hold the margins of the sheet-metal jacket securely in place.

In Figs. 17, 18, and 19 the sheet-metal jacket is shown as not extending beyond the end of the bed-plate, but as having a series of slots, $j$, cut through it, with screws $k$, Fig. 19, passing through the slots and entering the bed-plate, the under surface of the heads of these screws being rounded, as shown in Fig. 19, to provide for the curvature of the bed-plate. In this arrangement, as in the arrangement shown in Fig. 12, the slots through which the screws $k$ pass admit of sufficient motion between the bed-plate and the sheet-metal jacket.

In Figs. 20 and 21 a modification is shown which only differs from that shown in Figs. 12, 13, 14, and 15 in that in lieu of ears formed by the ends of the sheet-metal jacket a downwardly-extending flange, $l$, is attached to the ends of the sheet-metal jacket, provided with suitable slots and screws for the attachment thereof to the end of the bed-plate.

In Figs. 22 and 23 the ends of the sheet-metal jacket are shown as extending into ears projecting downwardly over the ends of the bed-plate, and spring-hooks $m$ are provided for attaching each of these ears to the end of the bed-plate, as shown, thereby producing a downward yielding pressure upon the margins of the sheet-metal jacket, as required. In lieu of the spring-hooks shown in Figs. 22 and 23, the hook shown in Fig. 24 may be used, which is made adjustable by the screw-swivel $n$, so that the requisite pressure can be always brought to bear upon the sheet-metal jacket.

In Figs. 25, 26, and 27 the sheet-metal jacket is shown as extending beyond the end of the bed-plate and as provided with a series of perforated lugs, $o$, through which the rod $p$ is passed, which rod is connected at each of its ends with the bed-plate, as shown in Fig. 26. The lugs $o$ are capable of sufficient motion lengthwise on this rod to provide for the necessary motion between the bed-plate and the sheet-metal jacket, while at the same time this arrangement holds the margins of the sheet-metal jacket securely against the bed-plate.

While I have shown the forms of mechanism which I prefer for carrying out my invention and various modifications thereof, I do not wish to confine myself to any particular form or modification, as I am aware that other modifications will suggest themselves to mechanics in the practical use of my invention.

I claim—

1. In a cloth-pressing machine, the combination, with the bed-plate and the cylinder and the sheet-metal jacket, of means, substantially as described, whereby the ends of the sheet-metal jacket are secured to the bed-plate and the margins thereof are prevented from springing into contact with the cylinder, as set forth.

2. In combination with the cylinder and the bed-plate, a sheet-metal jacket secured at one edge to the bed-plate and extending between the bed-plate and the cylinder, and the clamp overlapping the opposite edge of the sheet-metal jacket and holding it in place, substantially as described.

3. In a cloth-pressing machine, in combination, the cylinder, the bed-plate having a concave face, and a sheet-metal jacket formed in conformity with the face of the bed-plate, terminating at one edge substantially on the face of the bed-plate, and at the other edge extending into a flange overlapping the side of the bed-plate on the side where the cloth enters, the jacket at the first-named edge being sufficiently thin to pass through the opening between the cylinder and bed-plate when the cylinder is raised, whereby the sheet-metal jacket may be removed from between the cylinder and bed-plate transversely, substantially as described.

DAVID GESSNER.

Witnesses:
LIVINGSTON GIFFORD,
D. H. DRISCOLL.